J. D. POWELL.
TRACTOR.
APPLICATION FILED FEB. 3, 1916.

1,222,989.

Patented Apr. 17, 1917.
2 SHEETS—SHEET 1.

Inventor
J. D. Powell

By
Knight & Co.
Attorneys

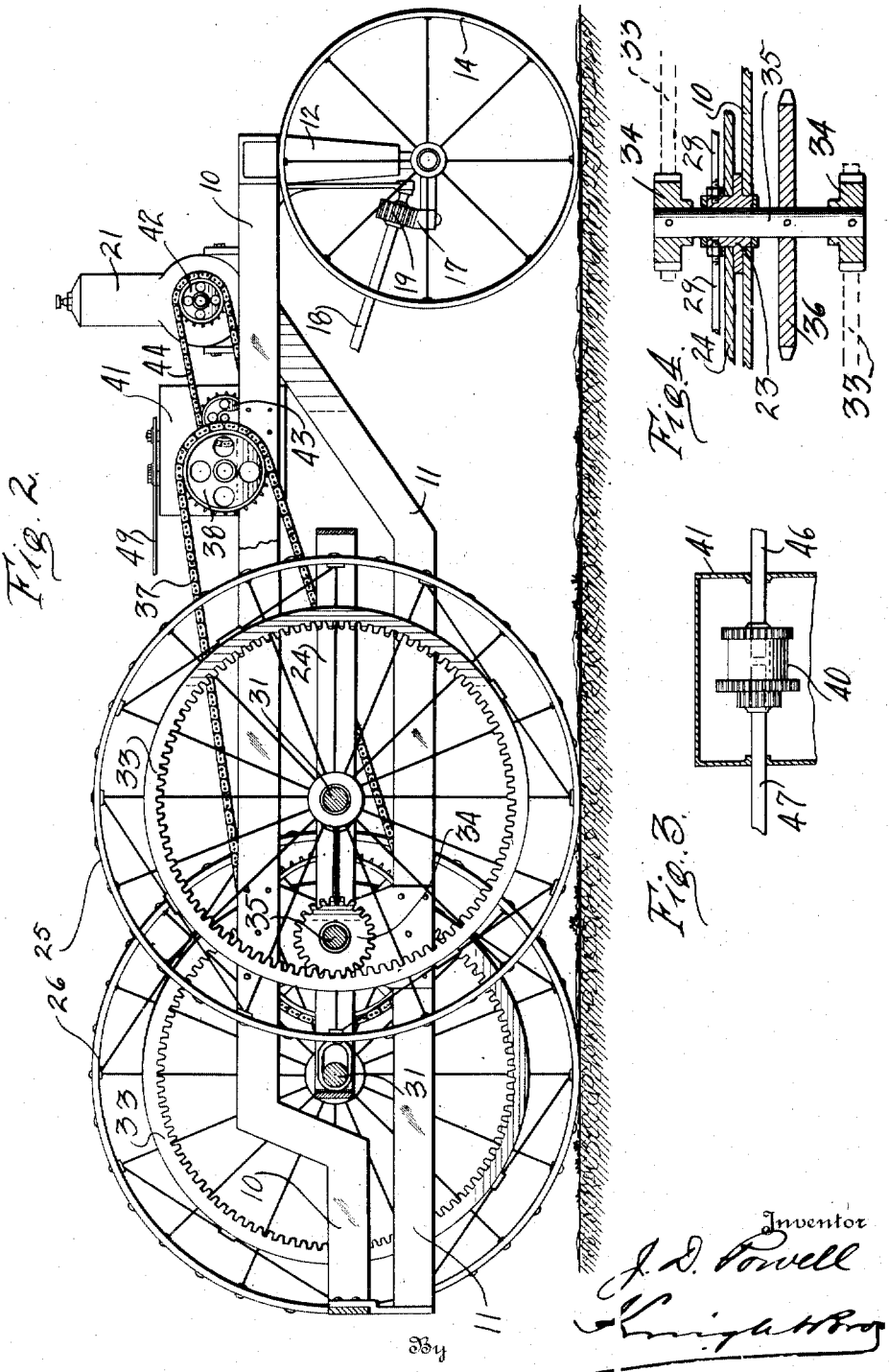

UNITED STATES PATENT OFFICE.

JEFFERSON D. POWELL, OF SEARCY, ARKANSAS.

TRACTOR.

1,222,989.  Specification of Letters Patent.  Patented Apr. 17, 1917.

Application filed February 3, 1916. Serial No. 75,994.

*To all whom it may concern:*

Be it known that I, JEFFERSON D. POWELL, a citizen of the United States, residing at Searcy, in the county of White and State of Arkansas, have invented certain new and useful Improvements in Tractors, of which the following is a specification.

This invention relates to tractors, and its primary object is to provide a tractor which is especially adapted for use in rice fields, to which end, one feature of the invention resides in providing a tractor that will traverse very rough and uneven ground, as well as soft or marshy ground without miring.

Another object of the invention is to provide a novel arrangement of driving mechanism, whereby the above-named advantage, as well as some others may be realized.

Further objects relate to the details of construction and coöperative relationship of the different parts of the machine, whereby its broader characteristics are embodied in a structure that may be used to overcome difficulties which have been heretofore present in machines of this kind.

The invention will be best understood upon reference to the accompanying drawings, in which—

Fig. 2 is a longitudinal section of the tractor along line 2—2, Fig. 1;

Fig. 3 is a view of the differential gearing and

Figure 1:
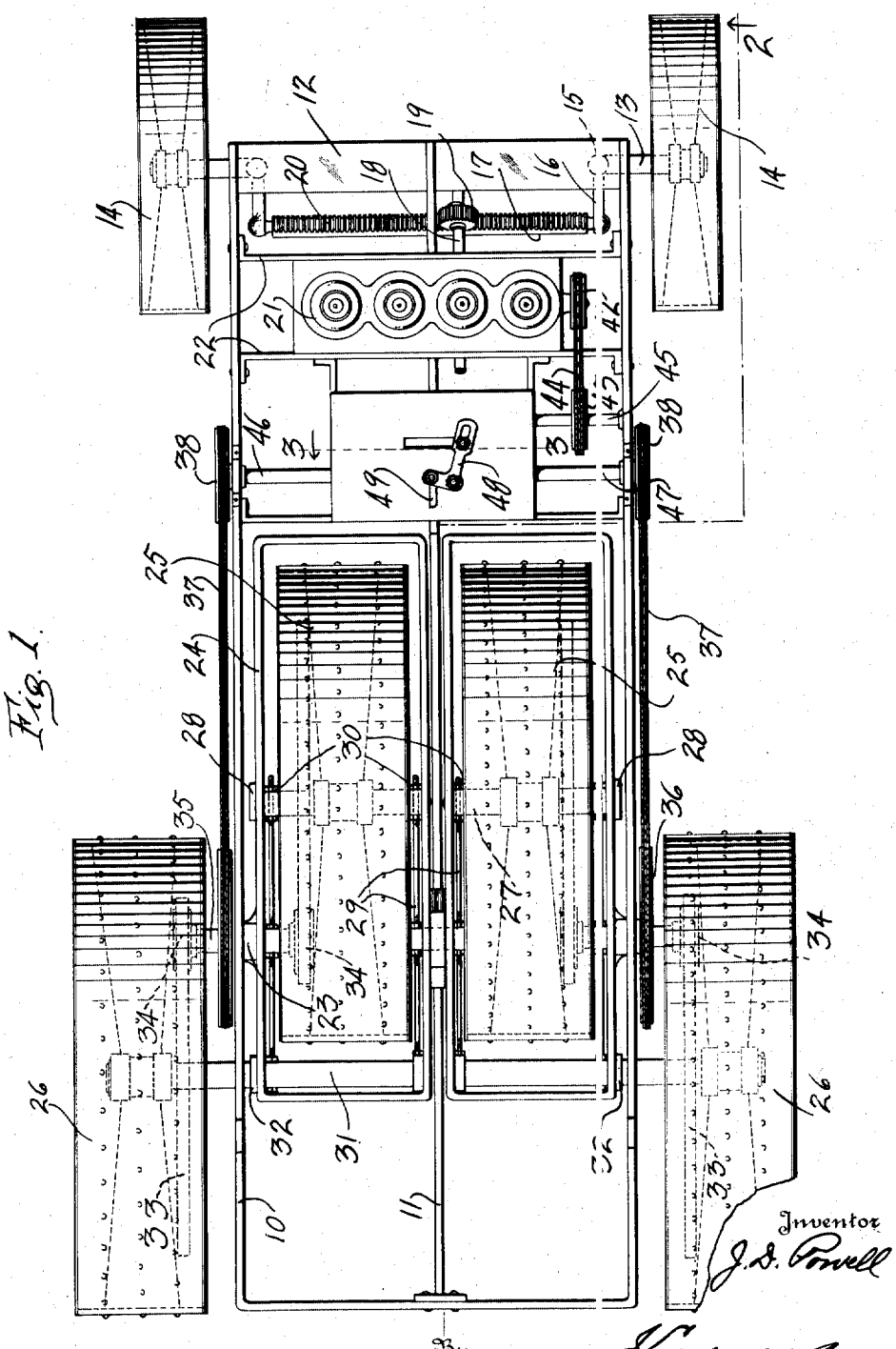
Figure 1 is a part section of a top plan view.

Fig. 4, a sectional view of some of the details.

The main framework 10, with a central brace 11, carries at its forward end a transverse truss 12 for the front or steering wheels 14. The latter are revolubly carried as is usual in automobile constructions, on short axle arms 13, which are journaled at 15 to turn in the horizontal plane, and provided with rearward steering shanks 16, rigidly secured to the respective axle arms. The ends of the shanks 16 are connected, so as to always stand parallel, by means of a bar 17 hinged at both ends. A steering shaft 18, revolubly mounted in the framework, has suitable connection with the bar 17 for displacing the latter in its longitudinal direction, thus accomplishing the turning of the front wheels 14 and the steering of the tractor. This connection may be of any known construction, such as chain drive, rack and pinion or the like, the drawing showing a pinion 19 on the steering shaft 18, meshing with the teeth 20 formed on the bar 17.

In bearings 23 on the main framework is mounted to oscillate entirely independent of each other, a pair of auxiliary frames 24 of rectangular shape, each carrying two rear traction wheels 25, 26. The two forward wheels 25 are each mounted on a throughgoing shaft 27 revolubly supported in bearings 28 on the auxiliary frames 24 in such a manner that a slight adjustment is possible of the wheels 25 with their shafts 27 in the direction of the frame bearings 23. For this purpose, adjusting rods 29 are provided, preferably secured in the frame bearings 23 and with their free ends engaging lugs on the wheel bearings 28, to which they can be locked by means of nuts 30.

Each of the traction wheels 25, 26 is provided with an internal gear 33 in mesh with a pinion 34 secured on a shaft 35 revolubly mounted in bearing 23, and on the shaft is also fixed a sprocket wheel 36 driven by a chain 37 from a sprocket wheel 38. A motor 21 is suspended between the two sides of the main frame 10 on partitions 22, and close behind the motor is situated a differential gear 40 in a casing 41. A transmission, consisting preferably of a pair of sprocket wheels 42, 43 and a chain 44, supplies power from the motor shaft to the driving shaft 45 of the differential gear 40, the latter subsequently transmitting power to the two alined shafts 46, 47, on which the sprocket wheels 38 are fixed, and thence to the traction wheels. The differential gear 40 may be of any known construction and should have three or four different speeds.

A starting and reversing device 48 controlled by a rod 49 is indicated above the casing 41.

Obviously, an inner wheel 25 and an outer wheel 26 carried in the same auxiliary frame always work in unison, so that the one is raised while the other goes down when running over uneven ground, the wheels in each auxiliary frame rising and falling independently of those in the other frame.

I claim:—

1. In a vehicle having a main framework, an auxiliary frame mounted to oscillate in a vertical plane in said main framework, a forward and a rearward traction wheel each provided with an individual shaft mounted to revolve in said auxiliary frame, a journal extending through said main framework and said auxiliary frame, the axis of revolution of which coincides with the axis of revolution of said auxiliary frame, means for revolving said journal, an internal gear in each of said traction wheels and pinions on said journal meshing with said gears for transmitting the rotation of said journal to the traction wheels.

2. In a tractor having a main framework, a pair of auxiliary frames mounted to oscillate in said main framework, the axes of oscillation of the two auxiliary frames being in alinement, a journal for each auxiliary frame extending through the same and through the main frame and placed in alinement with said axes of oscillation, a forward shaft carrying a traction wheel, a pair of bearings for said shaft in each of said auxiliary frames, a rearward shaft carrying a traction wheel, a pair of bearings therefor in each of said auxiliary frames, and means on the journals and on the traction wheels for transmitting the revolution of the journals to the respective traction wheels, the forward traction wheels being situated within their respective auxiliary frames and the rearward traction wheels outside thereof, whereby the two wheels in each frame will be oscillated, on going over uneven ground, independently of the two wheels mounted in the other auxiliary frame.

3. In a tractor having a main framework, a pair of auxiliary frames mounted to oscillate in said main framework, the axes of oscillation of the two auxiliary frames being in alinement, a journal for each auxiliary frame extending through the same and through the main frame and placed in alinement with said axes of oscillation, a forward shaft carrying a traction wheel, a pair of bearings for said shaft in each of said auxiliary frames, a rearward shaft carrying a traction wheel, a pair of bearings therefor in each of said auxiliary frames, and means on the journals and on the traction wheels for transmitting the revolution of the journals to the respective traction wheels, the forward traction wheels being situated within their respective auxiliary frames and the rearward traction wheels outside thereof, whereby the two wheels in each frame will be oscillated, on going over uneven ground, independently of the two wheels mounted in the other auxiliary frame, and means for revolving said journals.

4. In a tractor having a main framework, a pair of auxiliary frames mounted to oscillate in said main framework, the axes of oscillation of the two auxiliary frames being in alinement, a journal for each auxiliary frame extending through the same and through the main frame and placed in alinement with said axes of oscillation, a forward shaft carrying a traction wheel and a pair of bearings for said shaft in each of said auxiliary frames, a rearward shaft carrying a traction wheel, a pair of bearings therefor in each of said auxiliary frames, and means on the journals and on the traction wheels for transmitting the revolution of the journals to the respective traction wheels, the forward traction wheels being situated within their respective auxiliary frames and the rearward traction wheels outside thereof, whereby the two wheels in each frame will be oscillated, on going over uneven ground, independently of the two wheels mounted in the other auxiliary frame, a motor driven differential gear, a pair of compensatingly actuated driving shafts in said differential gear, a sprocket wheel on each of said driving shafts and corresponding sprocket wheels on said journals and chains connecting the journal sprocket wheels with the respective sprocket wheels on said driving shafts.

5. In a tractor having a main framework, a pair of auxiliary frames mounted to oscillate in said main framework, the axes of oscillation of the two auxiliary frames being in alinement, a journal for each auxiliary frame extending through the same and through the main frame and placed in alinement with said axes of oscillation, a forward shaft carrying a traction wheel, a pair of bearings for said shaft in each of said auxiliary frames, and a rearward shaft carrying a traction wheel, a pair of bearings therefor in each of said auxiliary frames, means on the journals and on the traction wheels for transmitting the revolution of the journals to the respective traction wheels, the forward traction wheels being situated within their respective auxiliary frames and the rearward traction wheels outside thereof, whereby the two wheels in each frame will be oscillated, on going over uneven ground, independently of the two wheels mounted in the other auxiliary frame, a motor driven differential gear, a pair of compensatingly actuated driving shafts in said differential gear, a sprocket wheel on each of said driving shafts and corresponding sprocket wheels on said journals and chains connecting the journal sprocket wheels with the respective sprocket wheels on said driving shafts, said differential gear including a hand operated starting and reversing device.

The foregoing specification signed at Searcy, Arkansas, this 14th day of January, 1916.

JEFFERSON D. POWELL.